June 8, 1954 — J. J. JOHNSON ET AL — 2,680,627
CLOSE COUPLING DEVICE FOR TRACTOR-TRAILERS
Filed March 15, 1950
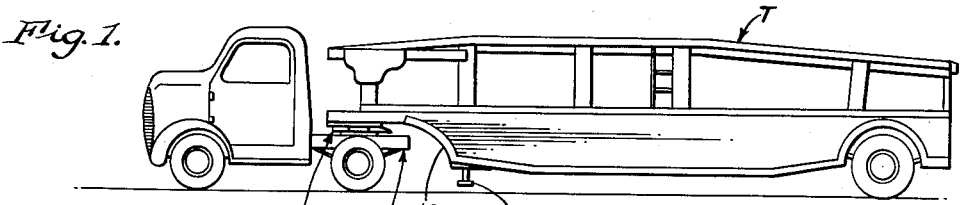
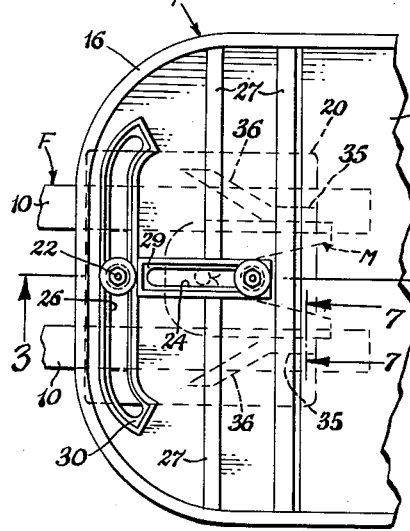
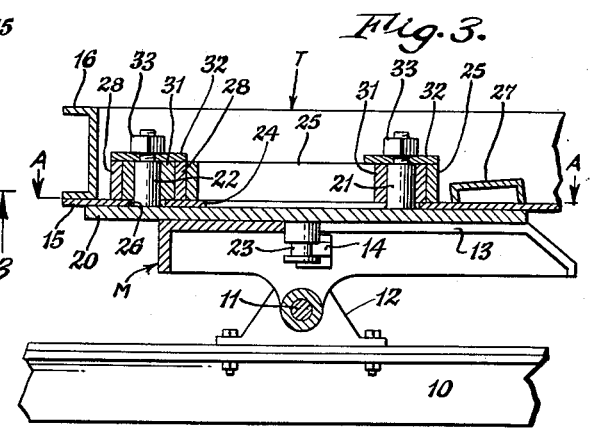
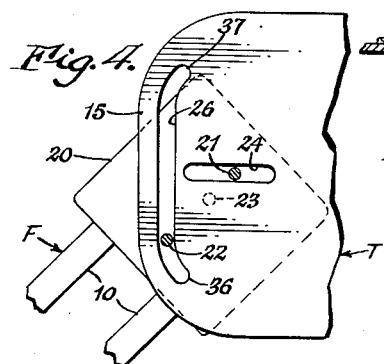
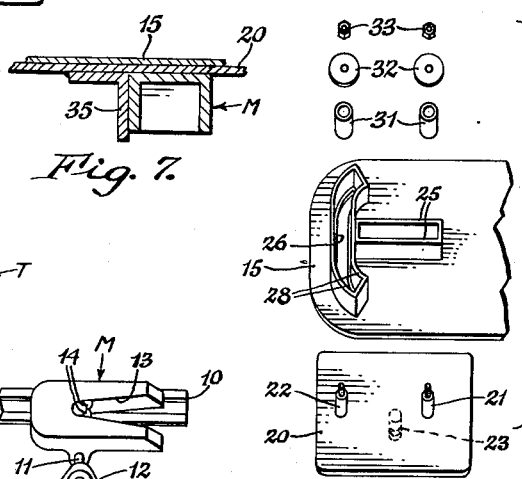
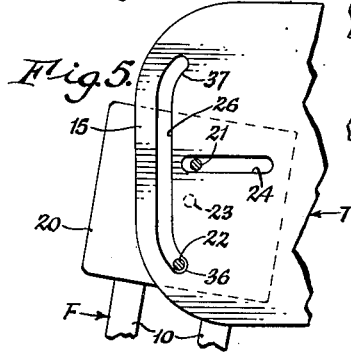
Inventors
John J. Johnson
Milford W. Lempke
Alfred J. Gentile
by Popp and Sommer
Attorneys.

Patented June 8, 1954

2,680,627

UNITED STATES PATENT OFFICE 2,680,627

CLOSE COUPLING DEVICE FOR TRACTOR-TRAILERS

John J. Johnson and Milford W. Lempke, Buffalo, and Alfred J. Gentile, Cheektowaga, N. Y., assignors to Delavan Welding Company, Inc., Buffalo, N. Y., a corporation of New York Application March 15, 1950, Serial No. 149,826

10 Claims. (Cl. 280—438)

This invention relates to improvements in truck-trailer coupling devices and more particularly to coupling devices for semi-trailers.

Truck and semi-trailer combinations are in common use at the present time. As usually connected together, the truck carries a fifth wheel member on which the front end of the semi-trailer is supported and a king pin on the trailer is adapted to be locked to the fifth wheel member. In such conventional coupling any relative angular movement between the truck and semi-trailer during turning takes place about the axis of the king pin, this axis being substantially fixed relative to the truck frame. If the semi-trailer has a portion of its body adjacent the rear end of the truck extending below the horizontal plane of the fifth wheel member as in a vehicle carrying or convoy type trailer, the angle through which the truck can turn relative to the trailer is usually limited by the rear wheels of the truck striking the trailer body. This angle in practice is substantially less than 90 degrees. At first blush, it could be said that this interference between the truck wheels and trailer body could be eliminated by further cutting back the depending portion of the trailer body. However, to do so would decrease the load carrying capacity of the trailer since the load carrying space lost at the front of the trailer by cutting it back could not be made up at the rear end of the trailer. To do this would necessitate increasing the over-all length of the truck-trailer unit and this may be impossible since the maximum over-all length of truck-trailer units is prescribed by highway regulations. A similar problem of interference exists in box-type trailer bodies which strike the cab of the truck during extreme turning, this problem having been solved by rounding the front corners of the trailer body at the expense of reducing the load carrying capacity of the trailer.

While coupling devices for connecting together a truck and semi-trailer which permit of close coupling the truck and trailer during straight ahead driving and yet operate during turning to spread or separate the vehicles farther apart to provide increased turning clearance have been devised these devices have not proven completely satisfactory for one reason or another.

It is accordingly the principal object of the present invention to provide an improved coupling device for connecting together a truck and a semi-trailer which device permits the truck and semi-trailer to be closely coupled during movement in a direction along the common center lines of the vehicles and which operates during relative turning between the truck and trailer to spread or further separate these vehicles thereby to provide increased clearance and avoid interference therebetween.

Another object is to provide such a coupling device which permits the truck to be turned through a greater angle relative to the semi-trailer, as much as 90° if desired.

Another object is to provide such a coupling device which permits of quick coupling and uncoupling of the truck and semi-trailer and this from any angle of misalignment therebetween.

Another object is to provide such a coupling device which reduces the tendency of the truck and semi-trailer to jack-knife and thereby improves the safety of the unit on the highways.

Another object is to provide such a coupling device which is strong, dependable and not likely to get out of order or require repairs.

A further object is to provide such a coupling device which is simple in construction and inexpensive to manufacture, and further of such a nature that existing trailers can be readily modified to incorporate the same.

Still further objects and advantages of the present invention will be apparent from the following detailed description and accompanying drawing wherein:

Fig. 1 is a side elevational view of a truck and semi-trailer embodying the present invention, the semi-trailer illustrated being of the vehicle carrying or convoy type.

Fig. 2 is an enlarged fragmentary top plan view of the front end of the semi-trailer and rear end of the truck shown in Fig. 1.

Fig. 3 is a still further enlarged fragmentary longitudinal sectional view thereof taken on line 3—3, of Fig. 2.

Figs. 4 and 5 are views similar to Fig. 2 but on a reduced scale and taken along the line A—A of Fig. 3 and illustrating the relative positions of parts of the coupling device during different turn angles of the truck relative to the semi-trailer.

Fig. 6 is an exploded elevational perspective view of the coupling device embodying the present invention.

Fig. 7 is an enlarged fragmentary vertical transverse sectional view of the coupling device taken on line 7—7, of Fig. 2.

The truck illustrated in the drawing is of conventional construction and is shown as having a frame F including a pair of transversely spaced longitudinal channel shaped frame members 10—10. In accordance with conventional practices a fifth wheel member M is shown as mounted on the frame members 10 near their rear ends so as to be oscillatable or rockable about a horizontal axis extending transversely of the truck frame, this being accomplished by arranging the fifth wheel member on a pivot rod 11 the ends of which are journalled in bearing blocks 12—12 bolted to the truck frame members 10.

The fifth wheel member M may be of any suitable conventional design, that shown having a slot or notch 13 extending longitudinally of the truck frame and leading from the rear transverse edge of the member to a point approximately above the pivot rod 11. A pair of movable jaws 14—14 are carried by the fifth wheel member M and are movable transversely thereof so as to embrace the rear side of the king pin on the semi-trailer and lock this pin in the bottom or at the forward closed end of the slot or notch 13. The jaws 14 form no essential part of the present invention and hence a detailed showing and description of their actuating means is not necessary.

The semi-trailer shown is represented by the reference character T and may be of any suitable construction. As shown the semi-trailer T at its front end has a deck plate 15 and a perimetrical channel shaped frame member 16. The semi-trailer shown has a main floor which is arranged considerably below the level of the deck plate 15 and the semi-trailer at its front end is cut out as indicated at 18 to provide clearance between the trailer and the rear wheels of the truck during turning. A conventional type landing gear 19 is shown for supporting the semi-trailer when uncoupled or disconnected from the truck.

The coupling device embodying the present invention is operatively interposed between the fifth wheel member M and the front end of the semi-trailer T which overlaps the truck frame F. The coupling device is shown as comprising a bearing member 20 of rectangular plate form arranged against the lower surface of the deck plate 15. This plate member carries an upstanding pivot pin 21, an upstanding follower pin 22 and a depending king pin 23. These three pins are shown as fixedly connected as by welding to the plate member 20 and arranged in line with one another, the upstanding follower pin 22 being near the front transverse edge of the plate member, the upstanding pivot pin 21 being near the rear transverse edge thereof, and the depending king pin being arranged intermediate the pins 21 and 22.

The plate member 20 is arranged for pivotal action relative to the semi-trailer T about the axis of the pivot pin 21 while said axis is movable in a fore and aft direction along the center line or longitudinal axis of the semi-trailer. To this end, the pivot pin 21 works in a guideway extending longitudinally of the semi-trailer T and the follower pin 22 works in a guideway extending transversely of the semi-trailer T. As shown, the deck plate 15 is provided with a longitudinal rectilinear slot 24 surrounded by upstanding side and end guide walls 25, and also with a transverse slot 26 surrounded by upstanding side and end guide walls 28. While the guide walls 25 and 28 are shown as welded to the deck plate 15, if desired, the deck plate 15 with slots 24 and 26 therein and the guide walls can be a casting so as to provide this structure as an integral member. Transverse members 27 can be arranged on the deck plate 15 to reinforce the same and also the side guide walls 25. The guide walls 25 and 28 are shown as set back slightly from the edge of the respective slot 24 or 26 so as to leave a continuous inwardly projecting flange 29 for the slot 24 and a similar flange 30 for the slot 26.

In order to facilitate movement of the pins 21 and 22 in their respective slots 24 and 26, each of these pins is provided with a roller sleeve 31 adapted to engage the opposing side walls of the respective guideway. The lower ends of the roller sleeves 31 ride on the respective flanges 29 and 30 and their upper ends are level with the upper edges of the guide walls 25 and 28.

Each of the pins 21 and 22 is further shown as having its upper end reduced and threaded to receive a washer 32 and nut 33. The washers 32 engage and straddle the upper edges of the respective guide walls 25 and 28 and serve to support the plate member 20 on the deck plate 15 of the semi-trailer T. Thus when the truck and trailer are uncoupled or completely disconnected the plate member 20 being carried by the semi-trailer, remains therewith.

When the truck and semi-trailer are operatively coupled together, the plate member 20 is prevented from rotating or shifting relative to the fifth wheel member M and is compelled to move therewith. The means shown for accomplishing this include a pair of transversely spaced guide bars 35 which closely embrace the opposite lateral sides of the fifth wheel member M adjacent the rear end thereof. These guide bars 35 being in rear of the king pin 23, there is provided a three point connection between the fifth wheel member M and the plate member 20 which prevents relative movement between these members so that when the truck turns relative to the semi-trailer the fifth wheel and plate members being locked together also turn with the truck frame. The front ends of the guide bars 35 flare forwardly and laterally outwardly as indicated at 36 to provide jointly a contracting guide track leading to the more closely spaced rear portions of the guide bars 35.

The transverse slot 26 can be rectilinear throughout its length or curved depending on the spreading action or turning clearance desired and as shown the intermediate portion of this transverse slot 26 is rectilinear and the extreme ends thereof curve rearwardly as indicated at 37.

The longitudinal and transverse guideways and the pin assemblies working therein can be covered, if desired, by box-like sheet metal covers (not shown).

Assuming the semi-trailer T standing on its landing gear 19, in order to couple the semi-trailer with a truck the latter is backed up so that the upper surface of the fifth wheel member M which will be in a downwardly and rearwardly tilted position engages the bottom surface of the plate member 20 and slides thereunder. During this sliding the king pin 23 enters the slot or notch 13 and is guided by the side walls thereof as well as by the guide bars 35 toward the bottom of this notch, the rear end of the fifth wheel member M tipping upwardly, after which the jaws 14 are moved toward each other to lock the king pin to the fifth wheel member M.

It will be seen that when the center lines of the truck and semi-trailer are in line as for straight ahead movement and as shown in Fig. 2, the follower pin 22 is at the center or midway of the ends of the transverse slot 26 and the pivot pin 21 is at the rear of the longitudinal slot 24. Further, the pins 21, 22 and 23 are in line with the common center lines of the truck and semi-trailer. Referring to Figs. 2 and 3, It will be seen that the drawing force of the truck is transmitted to the trailer through the follower pin 22, in particular through the roller sleeve 31 on this follower pin 22 engaging the front side wall 28 of the transverse guideway.

When the truck turns in either direction out of alignment with the semi-trailer the plate member 15 turns with the truck so that the line connecting the centers of the pins 21 and 22 remains in line with the center line of the truck, and pivotal action between the plate member 20 and the trailer takes place about the axis of the forwardly moving pivot pin 21. This forward movement of the pivot pin 21 along the centerline of the semi-trailer T is effected by the follower pin 22 being caused to move laterally along the transverse slot 26. Since the center to center distance between the pins 21 and 22 is fixed, both being mounted on the plate member 20, forward movement of the pivot pin 21 along the slot 24 is mandatory. It will therefore be seen that a longitudinal spreading of the truck and semi-trailer during turning takes place.

Referring to Fig. 4 which represents in plan the truck turned to the left relative to the semi-trailer through an angle of about 45 degrees, the follower pin is caused to move to that side of the transverse slot 26 leading toward the center of the turn and to permit this the pivot pin 21 has moved forwardly along the longitudinal slot 24.

Referring to Fig. 5, the truck is shown as turned relative to the semi-trailer through an angle of about 75 degrees. In this position the follower pin 22 is shown at the extreme outer end of the rearwardly curved end portion 37 of the slot 26 and the pivot pin 21 is at about its extreme forward position in the slot 24. Further turning of the truck relative to the semi-trailer if desired could be permitted by extending the ends of the slot 26 rearwardly concentric about the center of the pivot pin 21 in its extreme forward position. However, there would be no further effective spreading or further separating of the truck and semi-trailer during such extreme additional turning.

It will also be seen that as the truck turns back toward a straight ahead position the pins 21 and 22 will move from the extreme position shown in Fig. 5, through the intermediate position shown in Fig. 4 to the normal position shown in Fig. 2. During this reverse turning or straightening out of the truck and semi-trailer, the pin 21 moves toward the rear end of the longitudinal slot 24 thereby more closely coupling the truck and semi-trailer.

While the present invention defines, for purposes of illustration, a compensating coupling means interposed between a truck or tractor and a semi-trailer, it is to be understood that the invention is equally applicable to the close coupling of a pair of any type transport units.

We claim:

1. A tractor-trailer coupling device comprising, a movable member carried by said trailer, a pair of spaced pins on said movable member, first guide means on said trailer operatively associated with one of said pins and so arranged that said one of said pins is confined to rectilinear movement in a direction extending parallel to the longitudinal centerline of said trailer, second guide means on said trailer operatively associated with the other of said pins and so arranged that said other of said pins is confined to movement in a direction extending transversely of said trailer, at least the intermediate portion of said transverse movement being rectilinear, and means arranged to connect said movable member with a tractor so that the line connecting the centers of said pins is in line with and does not shift relative to the longitudinal centerline of said tractor, whereby during relative turning between said tractor and trailer said movable member has pivotal action relative to said trailer at all times about the axis of said one of said pins while the same moves along its rectilinear path.

2. In a semi-trailer, the combination therewith of a coupling device comprising, a plate member arranged below the front end of said trailer and movable relative thereto, a pair of spaced upstanding pins on said plate member, a guide on said trailer arranged to confine movement of one of said pins to rectilinear movement in a direction extending longitudinally of said trailer, a second guide on said trailer arranged in front of said first guide to confine movement of the other of said pins to movement in a direction extending transversely of said trailer, at least the intermediate portion of said transverse movement being rectilinear, and means arranged to connect said plate member with a tractor so that the line connecting the centers of said pins is in line with and does not shift relative to the centerline of said tractor, whereby during relative turning between said tractor and trailer said plate member has pivotal action relative to said trailer at all times about the axis of said one of said pins while the same moves along its rectilinear path.

3. In a semi-trailer having a deck plate at its front end, the combination therewith of a coupling device comprising, a plate member movably arranged against the bottom of said deck plate, a pair of spaced upstanding pins on said plate member and respectively projecting through longitudinal and transverse grooves in said deck plate, guide walls extending along the sides of said longitudinal groove to guide the respective one of said pins for rectilinear movement extending longitudinally of said trailer, guide walls extending along the sides of said transverse groove to guide the other of said pins for movement extending transversely of said trailer, at least the intermediate portion of said transverse movement being rectilinear, roller means on said pins engaging the respective guide walls, and means arranged to connect said plate member with a tractor so that the line connecting the centers of said pins is in line with and does not shift relative to the longitudinal centerline of said tractor, whereby during relative turning between said tractor and trailer said plate member has pivotal action relative to said trailer at all times about the axis of said one of said pins while the same moves along its rectilinear path.

4. In a semi-trailer having a deck plate at its front end and adapted for connection with a tractor having a fifth wheel member, the combination therewith of a coupling device comprising, a plate member movably arranged against the bottom of said deck plate, a pair of spaced upstanding pins on said plate member and respectively projecting through longitudinal and transverse grooves in said deck plate, guide walls extending along the sides of said longitudinal groove to guide the respective one of said pins for rectilinear movement extending longitudinally of said trailer, guide walls extending along the sides of said transverse groove to guide the other of said pins for movement extending transversely of said trailer, at least the intermediate portion of said transverse movement being rectilinear, roller means on said pins engaging the respective guide walls, a depending king pin on said plate member adapted to be locked to said fifth wheel member of said tractor, and means on said plate member cooperable with said fifth wheel member to prevent relative rotation between said members about the axis of said king pin, whereby during relative turning between said tractor and trailer said plate member has pivotal action relative to said trailer at all times about the axis of said one of said pins while the same moves along its rectilinear path.

5. In combination with a tractor having a fifth wheel member thereon and a trailer having one end supported thereby, of a coupling device comprising, a movable member carried by said trailer, a pivot pin and a follower pin on said movable member, first guide means on said trailer and arranged to guide said pivot pin for rectilinear movement longitudinally of said trailer, second guide means on said trailer and arranged to guide said follower pin for movement transversely of said trailer, at least the intermediate portion of said transverse movement being rectilinear, and means connecting said movable member and said fifth wheel member together to prevent relative movement therebetween, both said guide means being arranged so that during relative turning between said tractor and trailer said movable member has pivotal action relative to said trailer at all times about the axis of said pivot pin while the same moves along its rectilinear path whereby a close coupling is provided and turning clearance of progressively increasing amount is provided as said tractor is turned out of alignment with said trailer.

6. In combination with a tractor having a fifth wheel member thereon and a trailer having one end supported thereby, of a coupling device comprising, a plate fixed to said trailer and having therein a rectilinear slot extending longitudinally of said trailer and a transverse slot arranged in front of said longitudinal slot and extending transversely of said trailer, said transverse slot having at least its central portion rectilinear, a movable member carried by said trailer, an upstanding pivot pin on said movable member and guided for movement along said longitudinal slot, an upstanding follower pin on said movable member and guided for movement along said transverse slot, and means separably connecting said movable member and said fifth wheel member together to prevent relative movement therebetween, both said slots being arranged so that during relative turning between said tractor and trailer said movable member has pivotal action relative to said trailer at all times about the axis of said pivot pin while the same moves rectilinearly along said longitudinal slot whereby a close coupling is provided and turning clearance of progressively increasing amount is provided as said tractor is turned out of alignment with said trailer.

7. In combination with a tractor having a fifth wheel member thereon and a trailer having one end supported thereby, of a coupling device comprising, a plate fixed to said trailer and having therein a rectilinear slot extending longitudinally of said trailer and a transverse slot arranged in front of said longitudinal slot and extending transversely of said trailer, said transverse slot having at least its central portion rectilinear, a movable member carried by said trailer, an upstanding pivot pin on said movable member and guided for movement along said longitudinal slot, an upstanding follower pin on said movable member and guided for movement along said transverse slot, a depending king pin on said movable member removably locked to said fifth wheel member, and means on said movable member engageable with said fifth wheel member to prevent relative rotation between said members about the axis of said king pin, both said slots being arranged so that during relative turning between said tractor and trailer said movable member has pivotal action relative to said trailer at all times about the axis of said pivot pin while the same moves rectilinearly along said longitudinal slot whereby a close coupling is provided and turning clearance of progressively increasing amount is provided as said tractor is turned out of alignment with said trailer.

8. In combination with a tractor having a fifth wheel member thereon and a trailer having one end supported thereby, of a coupling device comprising, a plate fixed to said trailer and having therein a longitudinal slot and a transverse slot arranged in front of said longitudinal slot, said transverse slot having at least its central portion rectilinear, a movable member carried by said trailer, an upstanding pivot pin on said movable member and guided in said longitudinal slot for rectilinear movement, an upstanding follower pin on said movable member and guided in said transverse slot, a depending king pin on said movable member removably locked to said fifth wheel member and arranged intermediate said pivot and follower pins and in line therewith, and transversely spaced abutments on said movable member in rear of said king pin and engaging the sides of said fifth wheel member to prevent relative rotation between said members about the axis of said king pin, whereby a close coupling is provided and turning clearance is permitted when said tractor is turned out of alignment with said trailer.

9. In combination with a tractor having a fifth wheel member thereon and a trailer having one end supported thereby, of a coupling device comprising, a plate fixed to said trailer and having therein a longitudinal slot and a transverse slot arranged in front of said longitudinal slot, said transverse slot having at least its central portion rectilinear, a movable member carried by said trailer, an upstanding pivot pin on said movable member and guided in said longitudinal slot for rectilinear movement, an upstanding follower pin on said movable member and guided in said transverse slot, a depending king pin on said movable member removably locked to said fifth wheel member and arranged intermediate said pivot and follower pins and in line therewith, and depending guide bars on said movable member and arranged in rear of said king pin on opposite sides of the line connecting the centers of said pivot and follower pins and engaging the sides of said fifth wheel member to maintain the said pins in line with the center line of said tractor at all times, whereby a close coupling is provided and turning clearance is permitted when said tractor is turned out of alignment with said trailer.

10. In combination with a tractor having a fifth wheel member thereon and a trailer having a deck plate fixed thereto and overlapping said fifth wheel member, of a coupling device comprising, a plate member arranged between said fifth wheel member and said deck plate and carried by and movable relative to said deck plate, a pair of permanently spaced upstanding pins fixed to said plate member, spaced guide walls on opposite sides of a slot in said deck plate which extends longitudinally of said trailer and which receives one of said pins, spaced guide walls on opposite sides of a slot in said deck plate which is arranged in front of said longitudinal slot and extends transversely of said trailer and which receives the other of said pins, the opposing faces of said last mentioned guide walls extending rectilinearly at least along the central portion of said transverse slot, inwardly projecting and opposing flanges at the base of each of the corresponding pairs of said guide walls, a roller sleeve on each of said pins engageable with the corresponding pair of said guide walls and having its lower end opposing the corresponding ones of said flanges, a washer on the upper end of each of said pins and straddling the corresponding pair of said guide walls, a nut on each of said pins above the corresponding one of said washers, said plate member having pivotal action relative to said trailer at all times about the axis of said one of said pins, and means connecting said plate member to said fifth wheel member with the line connecting the centers of said pins in line with the centerline of said tractor and maintaining such arrangement at all times, whereby a close coupling is provided and turning clearance is permitted when said tractor is turned out of alignment with said trailer.

References Cited in the file of this patent

UNITED STATES PATENTS

| Number | Name | Date |
|---|---|---|
| 2,056,262 | Edwards | Oct. 6, 1936 |